United States Patent [19]
Bouillon et al.

[11] 3,929,986

[45] Dec. 30, 1975

[54] ANTIPERSPIRANT COMPOSITION CONTAINING DIOXALUMININ AND DIOXALUMINANE

[75] Inventors: Claude Bouillon, Eaubonne; Pierre DuFaure, Paris; Georges Rosenbaum, Asnieres, all of France

[73] Assignee: Societe Anonyme dite: L'Oreal, Paris, France

[22] Filed: Mar. 25, 1974

[21] Appl. No.: 454,732

Related U.S. Application Data

[62] Division of Ser. No. 294,927, Oct. 4, 1972, Pat. No. 3,819,761.

[30] Foreign Application Priority Data

Dec. 16, 1971 Luxemburg............................. 64463

[52] U.S. Cl. .............. 424/46; 260/333; 424/DIG. 5; 424/47; 424/68

[51] Int. Cl.$^2$............................................ A61K 7/38
[58] Field of Search........................... 424/47, 46, 68

[56] References Cited
UNITED STATES PATENTS

| | | | |
|---|---|---|---|
| 3,444,226 | 5/1969 | Schmank et al. ..................... | 424/47 |
| 3,819,671 | 6/1974 | Bouillon et al. .................. | 424/47 X |

*Primary Examiner*—Albert T. Meyers
*Assistant Examiner*—Dale R. Ore
*Attorney, Agent, or Firm*—Cushman, Darby & Cushman

[57] ABSTRACT

An antiperspirant composition contains in a cosmetic carrier as an active compound a dioxaluminin or dioxaluminane derivative.

9 Claims, No Drawings

ANTIPERSPIRANT COMPOSITION CONTAINING DIOXALUMININ AND DIOXALUMINANE

This is a division of application Ser. No. 294,927, filed Oct. 4, 1972, now U.S. Pat. No. 3,819,761.

The present invention relates to a cosmetic antiperspirant composition, to certain compounds usefully employed in these compositions and to a process for preparing these compounds.

It is well known that perspiration which results from the secretion of sudoriferous glands causes moistness of the skin and that heretofore there has been proposed the use on the skin of a variety of materials to reduce perspiration.

These materials include, for instance, aluminum chlorhydroxide complex, known under the tradename CHLORHYDROL, sodium aluminum chlorhydroxy lactate complex, known under the tradename CHLORACEL, aluminum phenylsulfonate, aluminum allantoinate, aluminum dihydroxy allantoinate, aluminum isopropylate as well as various other organic aluminum compounds or complexes such as, for example, the complex of aluminum chlorhydroxide with propylene glycol known under the tradename REHYDROL.

Most of the compositions based on previously known antiperspirant compounds, while they may effectively inhibit or diminish perspiration, they do however exhibit certain disadvantages which make their use in many cases quite difficult.

As will be appreciated, antiperspirant compositions are preferably used in the form of an aerosol spray and as such the antiperspirant compound must exhibit good solubility in alcohols, so as to provide good spraying or atomization characteristics.

Among the previously cited compounds, certain ones are insoluble in alcohol so that for an aerosol type composition they are generally useless. However, among those cited, some exhibit sufficiently good solubility characteristics in alcohol, notably ethanol, but their antiperspirant activity is clearly less acceptable.

It has now been found that a certain class of heterocycle compounds based on aluminum provide excellent antiperspirant compositions, these compounds exhibiting the advantages of previously known compounds without, however, having their principal disadvantages.

Moreover, it has been observed that in most situations, the antiperspirant compositions of the present invention exhibit, relative to conventionally known antiperspirant compositions, surprisingly better antiperspirant characteristics.

More particularly, the present invention relates to an antiperspirant composition comprising in combination a cosmetic carrier and at least one active compound of the formula

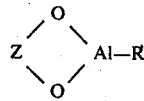

wherein
R is selected from the group consisting of chlorine and —OSO$_2$R' wherein R' is selected from the group consisting of alkyl having 1–4 carbon atoms, phenyl, p-chlorophenyl, tolyl and 2-oxo-10-bornanyl, and Z represents a member selected from the group consisting of (1) 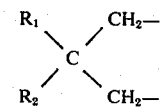

wherein
R$_1$ is selected from the group consisting of
 a. —COR$_3$ wherein R$_3$ is selected from the group consisting of (i) methyl and (ii) ethyl, in which case R$_2$ is selected from the group consisting of methyl and ethyl and (iii) phenyl in which case R$_2$ is selected from the group consisting of methyl, acetyl and —COOR$_4$ wherein R$_4$ is alkyl containing 1–4 carbon atoms,
 b. —COOR$_4$ wherein R$_4$ has the meaning given above in which case R$_2$ represents a member selected from the group consisting of methyl, —C ≡ N and —COOR$_4$ wherein R$_4$ has the meaning given above, and
 c. —NO$_2$ in which case R$_2$ represents a member selected from the group consisting of bromine and alkyl radical containing 1–3 carbon atoms, and (2) 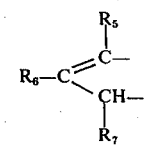

wherein
R$_7$ represents a member selected from the group consisting of
 d. methyl, in which case R$_6$ is —COOR$_8$ and R$_5$ represents —O-R$_8$ wherein R$_8$ in each instance represents alkyl having 1–4 carbon atoms, and
 e. hydrogen, in which case R$_6$ is selected from the group consisting of
  iv. —COR$_9$ wherein R$_9$ is selected from the group consisting of methyl, in which case R$_5$ is selected from the group consisting of methyl and phenyl, and phenyl, in which case R$_5$ is methyl;
  v. —COOR$_8$ in which case R$_5$ is selected from the group consisting of methyl, phenyl and —O-R$_8$ wherein R$_8$ has the same meaning given above; and
  vi. —C ≡ N in which case R$_5$ represents —O-R$_8$ wherein R$_8$ also has the above meaning.

Representative of the compounds usefully employed in the composition of the present invention are:

2-chloro-5,5-bis-(ethoxycarbonyl)-1,3,2-dioxaluminane of the formula

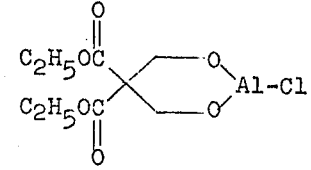

2-chloro-5-cyano-5-ethoxycarbonyl-1,3,2-dioxaluminane of the formula

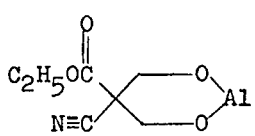

2-chloro-5-bromo-5-nitro-1,3,2-dioxaluminane of the formula

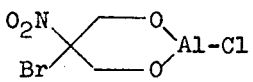

2-chloro-4-ethoxy-5-ethoxycarbonyl-1,2,3-dioxaluminane of the formula

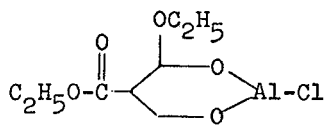

2-chloro-4-methyl-5-ethoxycarbonyl-1,3,2-dioxaluminin of the formula

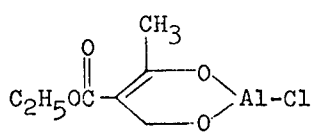

2-chloro-5-acetyl-4-methyl-1,3,2-dioxaluminin of the formula

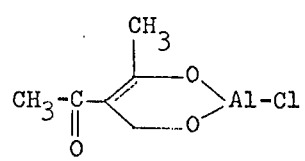

2-methanesulfonyl-5,5-bis-(ethoxycarbonyl) 1,3,2-dioxaluminane of the formula

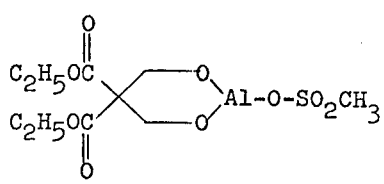

2-chloro-5-ethoxycarbonyl-4-phenyl-1,3,2-dioxaluminin of the formula

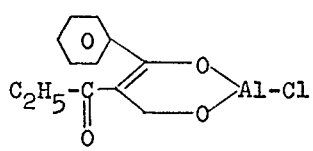

5-acetyl-5-benzoyl-2-chloro-1,3,2-dioxaluminane of the formula

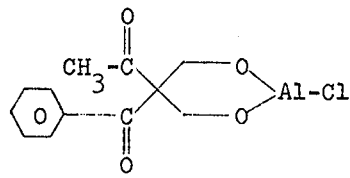

5-acetyl-2-chloro-4-phenyl-1,3,2-dioxaluminin of the formula

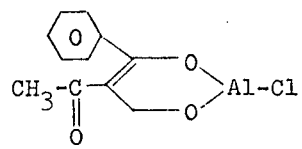

5-benzoyl-2-chloro-4-methyl-1,3,2-dioxaluminin of the formula

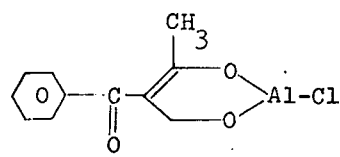

2-chloro-4-ethoxy 5-ethoxycarbonyl-6-methyl-1,3,2-dioxaluminin of the formula

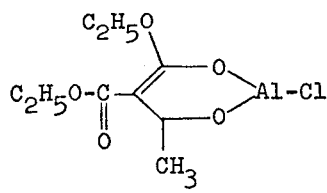

5,5-bis-(ethoxycarbonyl)-2-p-toluenesulfonyloxy-1,3,2-dioxaluminane of the formula

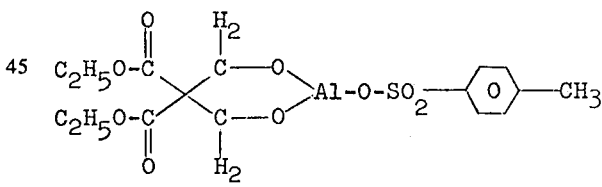

5-acetyl-2-chloro-5-methyl-1,3,2-dioxaluminane of the formula

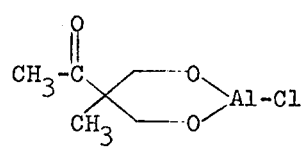

5-benzoyl-2-chloro-5-methyl-1,3,2-dioxaluminane of the formula

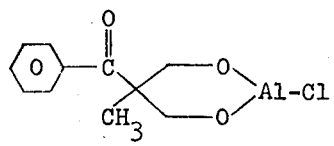

2-chloro-5-cyano-4-ethoxy-1,3,2-dioxaluminin of the formula

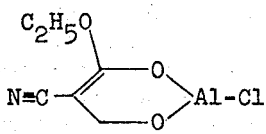

5-benzoyl-2-chloro-5-ethoxycarbonyl-1,3,2-dioxaluminane of the formula

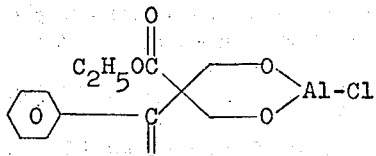

2-chloro-5-ethoxycarbonyl-5-methyl-1,3,2-dioxaluminane of the formula

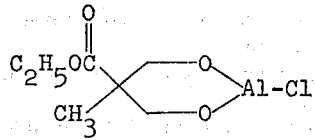

The cosmetic compositions according to the present invention can contain from 0.2 to 30%, and preferably, from 0.5 to 25% by weight of at least one active antiperspirant compound as defined above and can be provided in various forms, such as in the form of a lotion, a cream, a milk, a stick, a powder or in the form of an aerosol spray.

When the compositions according to the invention are provided in the form of a cream, the concentration of the active compound, in the cream base or carrier is preferably between 0.5 and 20 weight percent. The cream base or carrier is generally an oil-in-water emulsion comprising about 10–30 weight percent oil and 90 to 70 weight percent water.

Representative oils that can be employed to provide the oil phase of the emulsion include:
a. hydrocarbon oil such as paraffin oil, Purcellin oil, perhydrosqualene and a solution of microcrystalline wax in oil;
b. animal or vegetable oil such as sweet almond oil, avocado oil, calophyllum oil, lanolin, castor oil, horse oil, pork oil and olive oil;
c. mineral oil having an initial distillation point, at atmospheric pressure, of about 250°C and a final distillation point of about 410°C; and
d. saturated esters such as isopropyl palmitate, alkyl myristates wherein the alkyl moiety is selected from isopropyl, butyl and cetyl, hexadecyl stearate, ethyl palmitate, triglycerides of octanoic and decanoic acid and cetyl ricinoleate.

In the oil phase it is also possible to use silicone oils soluble in the other oils, such as dimethylpolysiloxane, methylphenylpolysiloxane and a siliconglycol polymer.

To promote or improve the retention of oils, the oil phase can also contain a wax such as Carnauba wax, candellila wax, beeswax, microcrystalline wax and ozokerite, the amount of wax employed generally ranging from about 0 to 20 percent by weight based on the weight of the oil employed in said oil phase.

Fatty alcohols such as stearyl alcohol, cetyl alcohol, 2-octyl-1-dodecanol, oxyethylenated fatty alcohols, propylene glycol and the like, can also be employed in the production of creams in accordance with the present invention, said fatty alcohols usually being present in amounts of about 0.5 to 10 percent by weight of said composition.

When the compositions of the present invention are in the form of sticks, the concentration of active compound is preferably between 0.5 to 10 weight percent.

The antiperspirant composition made in stick form in accordance with the invention can be produced from molten wax in which is incorporated the active compound of this invention. Generally, the active compound is incorporated into the stick as an emulsion of a solution thereof in water, in lower alkanol such as ethanol or isopropanol or in an aqueous solution of a lower alkanol containing generally from 30 to 90% by weight of said lower alkanol.

It has also been found advantageous, in the preparation of these antiperspirant sticks to introduce into the wax component about 0.5 to 10 weight percent based on the weight of the wax, an oil or fatty alcohol, as defined above.

The emulsifiers employed to produce the cream or stick of this invention can be those conventionally employed for these types of composition and particularly fatty amides such as coprah monoethanolamide, stearic diethanolamide and the like are usefully employed.

In the antiperspirant sticks of the present invention, the aqueous, alcoholic or hydroalcoholic solution of the active compound of the present invention represents about 10 to 60 weight percent of said stick.

When the composition according to the present invention is in powder form, the concentration of the active antiperspirant component is preferably between 5 and 25 weight percent of the total weight of the composition.

These compositions, in powder form, also can contain a conventional powder base and a binder. The powder base can be any conventional essentially nonhygroscopic powder commonly used in cosmetic or pharmaceutical products. Illustrative of such materials are talc, magnesium carbonate, starches such as rice starch or cornstarch, clay such as kaolin or bentonite, powdered stearates such as lithium stearate, zinc stearate and magnesium stearate; and mixtures of the same. Typical binders include mineral oil, vegetable oil, lanolin, petroleum, fatty alcohols, isopropyl esters such as isopropyl myristate and isopropyl palmitate and the like.

Preferably, the cosmetic composition of the present invention is in the form of a sprayable aerosol which can be an alcohol-based spray, a dry spray or a powder spray.

In this particular embodiment, the concentration of the active antiperspirant compound is generally between 1 and 5 weight percent of the total weight of the aerosol composition.

The alcohol-based spray in aerosol form contains, in addition to the active antiperspirant compound, an anhydrous alcohol selected from the group consisting of ethanol and isopropanol and a liquified aerosol propellant under pressure such as a halogenated hydrocarbon including, for example, trichlorofluoromethane or dichlorodifluoromethane and their mixtures. Obviously, other conventional aerosol propellants, inert with respect to the active compound of this invention can also be used.

In the case of a dry or powder spray, the composition contains in addition to the active compound and the liquified propellant as defined above, under pressure, a powder base and a binder also as defined above, the powder base being present in amounts of about 0.1 to 15 weight percent of the total aerosol composition and the binder, when present, being included in amounts of about 0.05 to 5 weight percent by weight of said composition. Generally the propellant, in these aerosol compositions is present in amounts of about 66 to 75 weight percent of the total aerosol composition.

It is understood that whatever form of the composition of this invention is chosen, i.e. a cream, a stick, or an aerosol spray, any other conventional adjuvant generally used in these types of compositions, which is inert with respect to the active component can be employed. For instance, it has been found advantageous to include in the composition of the present invention a preservative such as methyl parahydroxybenzoate or propyl parahydroxybenzoate, as well as a perfume.

The present invention also relates to a compound of the formula

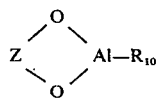

wherein $R_{10}$ is selected from the group consisting of chloro, —O-R″ wherein R″ is selected from the group consisting of methyl, ethyl, isopropyl and tertiary butyl, and —OSO$_2$R′ wherein R′ is selected from the group consisting of alkyl having 1–4 carbon atoms, phenyl, p-chlorophenyl, p-hydroxyphenyl, tolyl and 2-oxo-10-bornanyl, and Z is selected from the group consisting of (1) 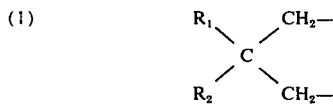

in which $R_1$ is selected from the group consisting of
a. —COR$_3$ wherein R$_3$ is selected from the group consisting of (i) methyl, (ii) ethyl, in which case $R_2$ is methyl and (iii) phenyl, in which case $R_2$ is selected from the group consisting of methyl, acetyl and —COOR$_4$ wherein R$_4$ is alkyl containing 1–4 carbon atoms;
b. —COOR$_4$ in which case $R_2$ is selected from the group consisting of methyl, —C≡N and —COOR$_4$, wherein R$_4$ has the meaning given above, and
c. —NO$_2$, in which case $R_2$ is selected from the group consisting of bromine and alkyl containing 1–3 carbon atoms; and (2) 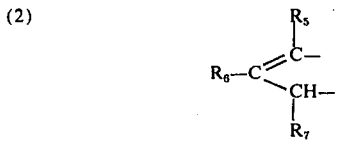

wherein $R_7$ is selected from the group consisting of
d. methyl, in which case $R_6$ represents —COOR$_8$ and $R_5$ represents —O-R$_8$ wherein R$_8$ represents alkyl having 1–4 carbon atoms; and
e. hydrogen, in which case $R_6$ is selected from the group consisting of (iv) —COR$_9$ wherein R$_9$ is selected from the group consisting of methyl, in which case $R_5$ is selected from the group consisting of methyl and phenyl, and phenyl, in which case $R_5$ is methyl, (v) —COOR$_8$, in which case $R_5$ is selected from the group consisting of methyl, phenyl and —O-R$_8$ wherein R$_8$ has the meaning given above, and (vi) —C≡N, in which case $R_5$ is —O-R$_8$ wherein R$_8$ has the meaning given above.

Among the new compounds, there can be particularly mentioned:
2-chloro-5,5-bis-(ethoxycarbonyl)-1,3,2-dioxaluminane;
2-chloro-5-cyano-5-ethoxycarbonyl-1,3,2-dioxaluminane;
2-chloro-5-bromo-5-nitro-1,3,2-dioxaluminane;
2-chloro-5-ethoxycarbonyl-4-ethoxy-1,3,2,-dioxaluminin;
2-chloro-5-ethoxycarbonyl-4-methyl-1,3,2-dioxaluminin;
2-methanesulfonyloxy-5,5-bis-(ethoxycarbonyl)-1,3,2-dioxaluminane;
5,5-bis-(ethoxycarbonyl)-2-p-toluenesulfonyloxy-1,3,2-dioxaluminane;
5-acetyl-2-chloro-5-methyl-1,3,2-dioxaluminane;
5-benzoyl-2-chloro-5-methyl-1,3,2-dioxaluminane;
2-chloro-5-cyano-4-ethoxy-1,3,2-dioxaluminin;
5-benzoyl-2-chloro-5-ethoxycarbonyl-1,3,2-dioxaluminane;
2-chloro-5-ethoxycarbonyl-5-methyl-1,3,2-dioxaluminane;
2-chloro-5-ethoxycarbonyl-4-phenyl-1,3,2-dioxaluminin;
5-acetyl-5-benzoyl-2-chloro-1,3,2-dioxaluminane;
5-acetyl-2-chloro-4-phenyl-1,3,2-dioxaluminin;
5-benzoyl-2-chloro-4-methyl-1,3,2-dioxaluminin;
2-chloro-4-ethoxy-5-ethoxycarbonyl-6-methyl-1,3,2-dioxaluminin;
2-isopropoxy-5-bromo-5-nitro-1,3,2-dioxaluminane of the formula

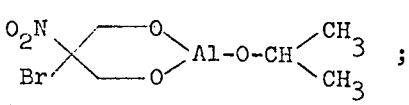

2-isopropoxy-5-ethoxycarbonyl-4-ethoxy-1,3,2-dioxaluminin of the formula

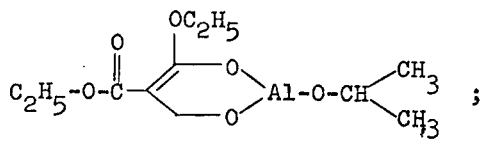

5-benzoyl-2-isopropoxy-4-methyl-1,3,2-dioxaluminin of the formula

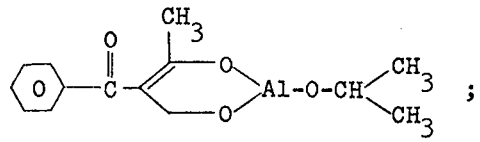

5-acetyl-2-isopropoxy-4-phenyl-1,3,2-dioxaluminin of the formula

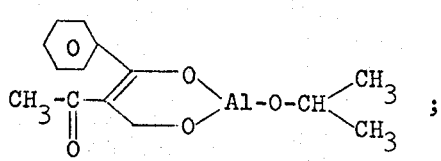

4-ethoxy-5-ethoxycarbonyl-2-isopropoxy-6-methyl-1,3,2-dioxaluminin of the formula

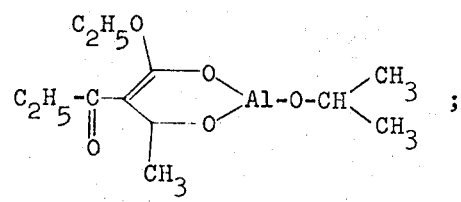

5-cyano-5-ethoxycarbonyl-2-isopropoxy-1,3,2-dioxaluminane of the formula

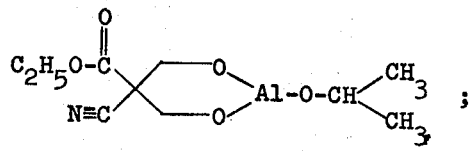

5-ethoxycarbonyl-2-isopropoxy-5-methyl-1,3,2-dioxaluminane of the formula

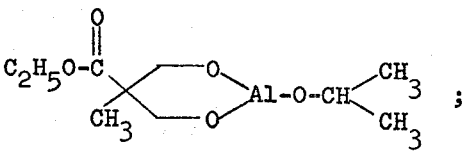

5-ethoxycarbonyl-2-isopropoxy-4-phenyl-1,3,2-dioxaluminin of the formula

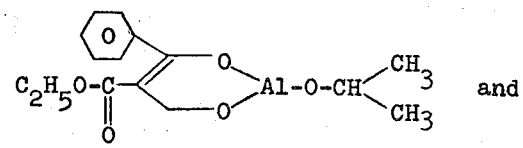 and 2,4-diethoxy-5-ethoxycarbonyl-1,3,2-dioxaluminin of the formula

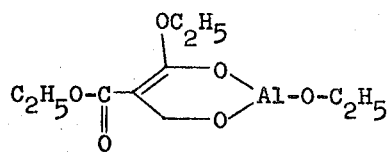

The present invention is also related to a process for preparing the active compound of formula (IV).

These active compounds in which Z represents a radical of formula (II) are prepared by starting with a β-glycol (1) according to the following reaction scheme:

SCHEME A

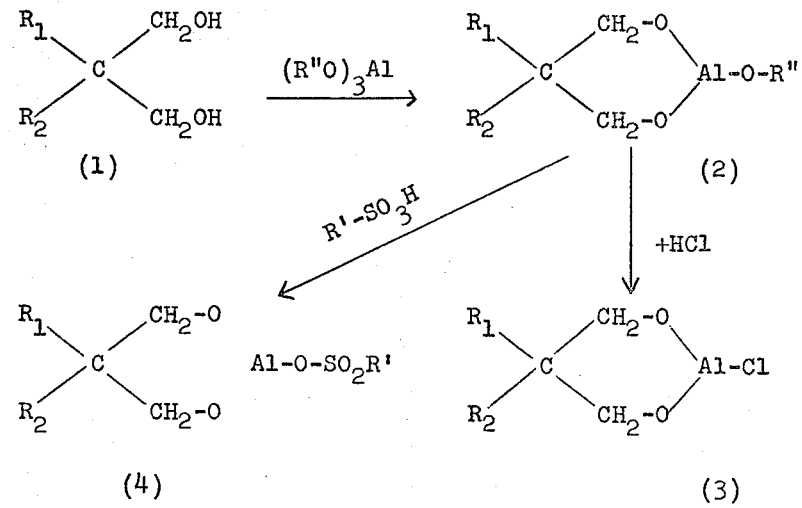

5-cyano-4-ethoxy-2-isopropoxy-1,3,2-dioxaluminin of the formula

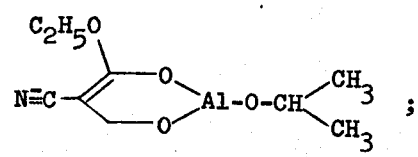

wherein R'' = $CH_3$, $C_2H_5$, $CH(CH_3)_2$ or $C(CH_3)_3$.

Generally speaking, the active compound of this invention can be produced by reacting an anhydrous solvent medium and equimolar amounts of β-glycol (1) with an aluminum alcoholate.

The β-glycols (1) employed can be prepared by action of formaldehyde on a compound possessing at least one electro-attractive function, such as a carbonyl, cyano or nitro group. A certain number of these β-glycols are described in the literature:

| | |
|---|---|
| R=R₂=CO₂C₂H₅ | Organic Synth., Vol. 40, p.27 (and indicated references) |
| R₁=COCH₃ and R₂=CO₂C₂H₅ | McMurray, J.Chem.Soc. 1967, p.1804 |
| R₁=R₂=COCH₃ | Kennedy, J.Chem.Soc., 1969, p.879 |
| R₁=R₂= —C≡N | Ardis et coll. J.A.C.S., 1950, 72, p.1305 |
| R₁=COCH₃ and R₂=CH₃ or COC₂H₅ | Morgan, Chem.Ind., 1938, p.885 Morgan, J.Chem.Soc., 1932 p.2267 |
| R₁=NO₂ and R₂= alkyl | Vanderbilt, Ind.Eng.Chem., 1940 32, 34. |
| R₁=CO₂CH₃ and R₂=CH₃ | Walker, "Formaldehyde", Reinhold, 1964, p.291, CA 68 P 60535/S |

Further, it is apparent that, when R₁ and R₂ are both electro-attractive, as is the case of active methylene compounds, it is most often unnecessary to proceed to isolate and to purify the β-glycol. In effect, the transformation of the active methylene compound to the β-glycol of type (1) is effected in a practically quantitative manner and the crude product of the reaction, extracted by an appropriate solvent, is most often suitable for the preparation of aluminum derivatives (2), (3) and (4). This process is particularly advantageous for it limits to a minimum the number of operating steps to be taken.

The reaction of aluminum alcoholate (R″O)₃Al with a β-glycol (1) is carried out generally at ambient temperature and exhibits a certain exothermicity. However, it is often useful to heat the reaction mixture to the boiling point of the solvent. Representative useful anhydrous solvents for this reaction, include an alcohol, such as ethyl, methyl, isopropyl and tertio-butyl alcohol, an aromatic hydrocarbon such as benzene and toluene, a chlorinated hydrocarbon such as chloroform, esters and ethers.

For the preparation of compounds of formula (3) and (4), it is not necessary to isolate the compound of formula (2). In effect, the solutions of compounds (2) in the anhydrous solvent medium can be directly reacted either with gaseous hydrochloric acid to produce compound (3) or with sulfonic acid in solution in an anhydrous solvent to produce the compound (4).

Compounds (3) and (4) can be easily isolated by evaporation of the reaction solvents.

The preparation of compounds of formula (IV) in which Z represents a radical of formula (III) and R₇ represents hydrogen, is realized according to scheme B, by reacting initially a compound of formula (5) in the presence of an aluminum alcoholate under the same conditions given above for the preparation of compounds of formula (2). One obtains thus the compound of formula (6) which by simple heating is transformed into a compound of formula (7) with release of formol.

SCHEME B

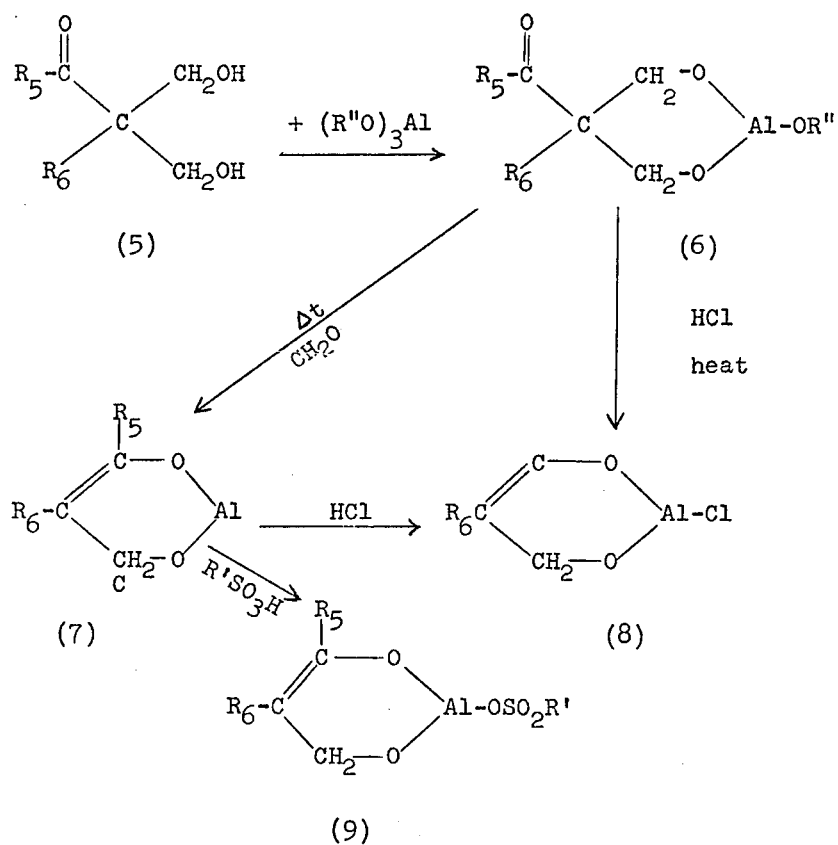

The compounds of formula 7 can generally be isolated or transformed directly into compounds of formula 8 by reaction with hydrochloric acid or into compounds of formula 9 by reaction with sulfonic acid.

The preparation of compounds of formula (IV) in which the radical Z represents the radical of formula (III) and $R_7$ represents a methyl radical is effected according to scheme C by reacting the compounds of formula (10) in the presence of aluminum alcoholate under the same conditions as those described above. There is thus obtained the compound of formula (11) which can easily be isolated or transformed directly into compounds of formula (12) by reaction with hydrochloric acid or into compounds of formula (13) by reaction with a sulfonic acid.

wherein $R_1$ and $R_2$ are as above defined and 2.2 to 3.0 moles of a 30% aqueous formaldehyde solution are mixed and cooled to a temperature of $-20°$ to $-10°C$. There is then added to this solution 2 to 8 g of potassium carbonate, dissolved in a minimum amount of water. The resulting mixture is stirred for a period of about 15 to 120 minutes while maintaining the temperature between $0°$ and $-15°C$. The solution is then saturated with ammonium sulfate and extracted with an appropriate solvent such as ethyl acetate or ether. After drying in the presence of anhydrous magnesium

SCHEME C

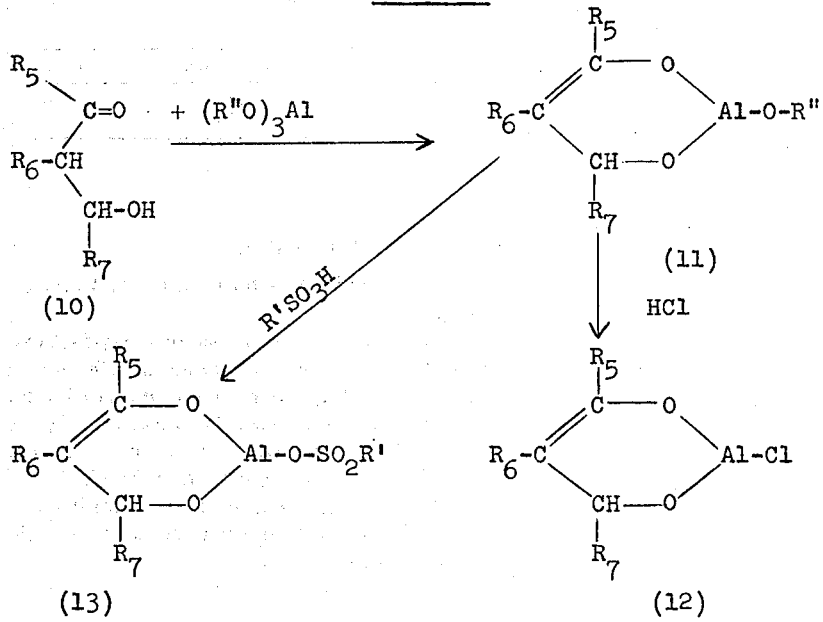

It must be remarked that the preparation of compounds of formula (IV), in which $R_{10}$ represents chlorine, by the reaction of hydrochloric acid with compounds of formula (IV) wherein $R_{10}$ represents alkoxy, is often incomplete because of a deficiency of chlorine with respect to aluminum. However, the rate of conversion is nevertheless always greater than or at least equal to 80%.

There will now be given by way of illustration and without any limiting character, several examples of the preparation of the active compounds of the present invention and some representative examples of the preparation of antiperspirant compositions of the invention using these active compounds. It will be noted that these active compounds are characterized by having substituted at position 5 of the dioxaluminin or dioxaluminane at least one electro-attractive group such as an ester, a ketone, a nitrile or a nitro group. These electro-attractive groups thus confer to the compositions of the invention some excellent properties.

GENERAL METHOD OF PREPARING BETA-GLYCOLS OF FORMULAE (1) AND (5)

One mole of an active methylene product of the formula:

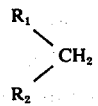

sulfate, the extracted solution can be utilized directly for reaction with an aluminum alcoholate according to schemes A or B.

EXAMPLES OF PREPARATION

EXAMPLE 1

Preparation of 2-chloro-5,5-bis-(ethoxycarbonyl)-1,3,2-dioxaluminane.

Method A

There is heated to reflux, for a period of 2 hours with continuous stirring, a mixture comprising a solution of 20.4 g of aluminum isopropylate in 160 ml of benzene and a solution of 22 g of bis-(hydroxymethyl) ethyl malonate in 160 ml of methanol. After cooling this mixture to ambient temperature, there is added to the gel thus obtained 33.3 ml of a solution of 3N dry hydrochloric acid in isopropanol. The resulting reaction mixture is then continued to be stirred for a period of one hour.

After evaporating the solvent under reduced pressure there is thus obtained a colorless crystalline appearing product exhibiting yellowish glints. This product is obtained with ½ mole of isopropanol of solvation.

| | Calculated | Found |
|---|---|---|
| Yield (g) | 31.05 | 29.76 |
| Al (meq/g) | 3.22 | 3.28 |
| Cl (meq/g) | 3.22 | 2.97 |

Method B

There is stirred for a period of 3 hours at ambient temperature a mixture of 8.8 g of 2,2-bis-(hydroxymethyl) ethyl malonate and 6.5 g of aluminum ethylate in 150 ml ethanol. To this mixture there are then added 8.5 ml of a 4.75 N dry hydrochloric acid solution in ethanol and the resulting mixture is heated at 55°C for a period of 30 minutes. The resulting solution is evaporated to dryness under reduced pressure at a temperature lower than 50°C, thereby producing a colorless solid containing ½ mole of ethanol of solvation.

| | Calculated | Found |
|---|---|---|
| Yield (g) | 12.15 | 12.35 |
| Al (meq/g) | 3.3 | 3.17 |
| Cl (mq/g) | 3.3 | 2.81 |

EXAMPLE 2

Preparation of 2-methanesulfonyloxy-5,5-bis-(ethoxycarbonyl)-1,3,2-dioxaluminane.

There is heated to reflux for a period of 2 hours a mixture comprising a solution of 20.4 g of aluminum isopropylate in 100 ml of benzene and a solution of 22 g of bis-(hydroxymethyl) ethyl malonate in 100 ml of methanol.

After cooling, there is added to the resulting gel a solution of 9.6 g of methane sulfonic acid in 50 ml of methanol. The reaction mixture is then stirred for 1 hour, after which it is evaporated to dryness, thereby producing a colorless crystalline appearing solid.

| | Calculated | Found |
|---|---|---|
| Yield (g) | 34 | 34.7 |
| Al (meq/g) | 2.94 | 2.90 |

EXAMPLE 3

Preparation of 2-para-toluene sulfonyloxy-5,5-bis-(ethoxycarbonyl)-1,3,2-dioxaluminane There is heated for a period of 2 hours at 50°C a mixture comprising a solution of 22 g of bis-(hydroxymethyl) ethyl malonate in 100 ml of chloroform and a solution of 20.4 g of aluminum isopropylate in 100 ml of chloroform.

After cooling, there is then added a solution of 17.2 g of anhydrous para-toluene sulfonic acid in 300 ml of benzene and the reaction mixture is stirred for a period of 1 hour. Subsequently, the reaction mixture is evaporated to dryness under reduced pressure, thereby producing a yellowish white solid product. This product is obtained with ½ mole of isopropanol of solvation.

| | Calculated | Found |
|---|---|---|
| Yield (g) | 44.6 | 45.5 |
| Al (meq/g) | 2.20 | 2.22 |

EXAMPLE 4

Preparation of 2-isopropoxy-5-ethoxycarbonyl-4-ethoxy-1,3,2-dioxaluminin.

There is heated to reflux for a period of 2 hours with continuous stirring a mixture comprising a solution of 22 g of bis-(hydroxymethyl) ethyl malonate in 200 ml of methanol and a solution of 20.4 g of aluminum isopropylate in 200 ml of benzene. The resulting mixture is then evaporated to dryness under reduced pressure at a temperature of about 70°C, thus yielding a colorless crystalline appearing solid.

| | Calculated | Found |
|---|---|---|
| Yield (g) | 27.4 | 26.8 |
| Al (meq/g) | 3.64 | 3.64 |

EXAMPLE 5

Preparation of 2-chloro-5-ethoxycarbonyl-4-ethoxy-1,3,2-dioxaluminin.

To a suspension of 27.4 g of 2-isopropoxy-5-ethoxycarbonyl-4-ethoxy-1,3,2-dioxaluminin in 100 ml of methanol, there are added 50 ml of a solution of 2N dry hydrochloric acid in isopropanol. The resulting mixture is agitated for a period of 3 hours and then evaporated to dryness under reduced pressure, thereby yielding a colorless crystalline appearing product exhibiting yellowish glints. This product is obtained with ½ mole isopropanol of solvation.

| | Calculated | Found |
|---|---|---|
| Yield (g) | 28.05 | 27.3 |
| Al (meq/g) | 3.56 | 3.52 |
| Cl (meq/g) | 3.56 | 3.10 |

EXAMPLE 6

Preparation of 2-isopropoxy-5-bromo-5-nitro-1,3,2-dioxaluminane.

There is heated to reflux for a period of 2 hours a mixture comprising a solution of 20.4 g of aluminum isopropylate in 100 ml of benzene and a solution of 20 g of 2-bromo-2-nitro-1,3-propanediol in 100 ml of methanol.

After evaporation of the solvents under reduced pressure, there is thus obtained a white powder.

| | Calculated | Found |
|---|---|---|
| Yield (g) | 28.4 | 28.4 |
| Al (meq/g) | 3.52 | 3.38 |

EXAMPLE 7

Preparation of 2-chloro-5-bromo-5-nitro-1,3,2-dioxaluminane.

There is heated to reflux for a period of 2 hours with continuous agitation a mixture comprising a solution of 10.2 g of aluminum isopropylate in 50 ml of benzene and a solution of 10 g of 2-bromo-2-nitro-1,3-propanediol in 50 ml of methanol.

The resulting reaction mixture is then cooled to ambient temperature and there are then added to this mixture 25 ml of a solution of 2 N dry hydrochloric acid in isopropanol. The resulting mixture is stirred for a period of 1½ hours.

After evaporation of the solvent, under reduced pressure, there is thus obtained a colorless product exhibiting beige glints. This product is obtained with ½ mole of isopropanol of solvation.

|  | Calculated | Found |
|---|---|---|
| Yield (g) | 14.52 | 14.98 |
| Al (meq/g) | 3.44 | 3.35 |
| Cl (meq/g) | 3.44 | 3.17 |

EXAMPLE 8

Preparation of 2-chloro-5-ethoxycarbonyl-4-methyl-1,3,2-dioxaluminin.

There is stirred for a period of 2 hours at ambient temperature a mixture of a solution of 190 g of 2,2-bis-(hydroxymethyl) ethyl acetylacetate in 1 liter of methanol and a solution of 204 g of aluminum isopropylate in a liter of benzene. After permitting the resulting mixture to stand overnight there are then added 333.3 ml of a solution of 3 N dry hydrochloric acid in isopropanol and the resulting reaction mixture is then stirred for a period of 2 hours.

At the end of this time the solvents are evaporated under reduced pressure, thus yielding a yellow crystalline appearing product. This product is obtained with ½ mole of isopropanol of solvation.

|  | Calculated | Found |
|---|---|---|
| Yield (g) | 250.5 | 255 |
| Al (meq/g) | 3.98 | 3.78 |
| Cl (meq/g) | 3.98 | 3.18 |

EXAMPLE 9

Preparation of 2-chloro-5-acetyl-4-methyl-1,3,2-dioxaluminin.

There is stirred for a period of 5 hours at ambient temperature a mixture comprising a solution of 8 g of bis-(hydroxymethyl) acetylacetone in 80 ml of methanol and a solution of 10.2 g of aluminum isopropylate in 80 ml of benzene.

At the end of this time there are then added to this mixture 25 ml of a solution of 2 N dry hydrochloric acid in isopropanol and the resulting mixture is left to stand overnight.

After evaporation to dryness of the reaction mixture there is thus obtained a light beige powder. This product is obtained with ½ mole of isopropanol of solvation.

|  | Calculated | Found |
|---|---|---|
| Yield (g) | 11.02 | 11.5 |
| Al (meq/g) | 4.54 | 4.32 |
| Cl (meq/g) | 4.54 | 3.93 |

EXAMPLE 10

Preparation of 2-chloro-5-cyano-5-ethoxycarbonyl-1,3,2-dioxaluminane.

There is stirred for a period of 2 hours at ambient temperature a mixture comprising a solution of 204 g of aluminum isopropylate in a liter of benzene and a solution of 173 g of bis-(hydroxymethyl) ethyl cyanacetate in a liter of methanol. There are added to this mixture 350 ml of a solution of 2 N dry hydrochloric acid in isopropanol. Stirring of the reaction mixture is continued for one hour. At the end of this time, the product passes into solution.

After evaporation of the solvents, under reduced pressure, there is obtained a colorless crystalline appearing product. This product is obtained with ½ mole of isopropanol of solvation.

|  | Calculated | Found |
|---|---|---|
| Yield (g) | 263.5 | 268 |
| Al (meq/g) | 3.79 | 3.70 |
| Cl (meq/g) | 3.79 | 3.12 |

EXAMPLE 11

5-cyano-5-ethoxycarbonyl-2-isopropoxy dioxaluminane and 5-cyano-4-ethoxy-2-isopropoxy dioxaluminin.

There is stirred for a period of 2 hours at ambient temperature a mixture comprising a solution of 34.6 g of bis-(hydroxymethyl) ethyl cyanacetate in 200 ml of methanol and a solution of 40.8 g of aluminum isopropylate in 200 ml of benzene. After evaporating the resulting reaction mixture to dryness, under reduced pressure, without exceeding a temperature of 45°C, there is thus obtained a solid colorless product.

|  | Calculated | | Found |
|---|---|---|---|
|  | Dioxaluminane | Dioxaluminin |  |
| Yield (g) | 51.4 | 45.4 | 49.3 |
| Al (meq/g) | 3.86 | 4.40 | 4.06 |

There is thus obtained a mixture which includes about 65% dioxaluminane and 35% dioxaluminin. Conversion to Dioxaluminane.

30 g of the mixture obtained above are heated to 80°C under a pressure of 20 mm of mercury for 2 hours in a rotating evaporator.

|  | Calculated | Found |
|---|---|---|
| Yield (g) | 27.72 | 27.18 |
| Al (meq/g) | 4.40 | 4.39 |

EXAMPLE 12

2-chloro-5-cyano-4-ethoxy-1,3,2-dioxaluminin.

To a suspension of 10 g of 2-isopropoxy-5-cyano-4-ethoxy-1,3,2-dioxaluminin in 100 ml of methanol there are added 25.2 ml of a solution of 1.74 N dry HCl in isopropanol and the resulting reaction mixture is stirred for a period of 1 hour. After evaporation to dryness under reduced pressure and drying at 80°C there is obtained a solid yellow product including ½ mole of isopropanol of solvation.

|  | Calculated | Found |
|---|---|---|
| Yield (g) | 10.25 | 10.52 |
| Al (meq/g) | 4.27 | 4.08 |
| Cl (meq/g) | 4.27 | 4.01 |

EXAMPLE 13

5-acetyl-2-chloro-5-methyl-1,3,2-dioxaluminane.

There is heated to reflux for a period of 1½ hours a mixture of 28.8 g of 3,3-bis-(hydroxymethyl)-2-butanone in 100 ml of chloroform and a solution of 36.7 g of aluminum isopropylate in 100 ml of chloroform. After cooling, there are added 85.7 ml of a solution of 2.1 N dry HCl in isopropanol. The resulting reaction mixture is stirred for a period of one hour. After evaporation to dryness there is thus produced an orange powder. The product retains ½ mole of isopropanol of solvation.

|  | Calculated | Found |
|---|---|---|
| Yield (g) | 40 | 40 |
| Al (meq/g) | 4.5 | 4.35 |
| Cl (meq/g) | 4.5 | 4.22 |

EXAMPLE 14

5-benzoyl-2-chloro-5-ethoxycarbonyl-1,3,2-dioxaluminane.

There is stirred for a period of 2 hours at ambient temperature a mixture comprising a solution of 14.8 g of 2,2-bis-(hydroxymethyl)-3-oxo-3-phenyl ethyl propionate in 57 g of ethyl acetate (this solution is obtained by extraction of the reaction product of ethyl benzoylacetate and formaldehyde according to the general method described above for the preparation of β-glycols) and a solution of 11.94 g of aluminum isopropylate in 25 ml of chloroform. There are then added 12.4 ml of a solution of 4.72 N dry HCl in ethanol and the stirring is maintained for a period of 1 hour. After evaporation to dryness under reduced pressure at a temperature ≤ 40°, there is thus obtained a colorless powder. This powder contains a ½ mole of isopropanol of solvation.

|  | Calculated | Found |
|---|---|---|
| Yield (g) | 20.1 | 20.5 |
| Al (meq/g) | 2.92 | 2.88 |
| Cl (meq/g) | 2.92 | 2.87 |

EXAMPLE 15

5-ethoxycarbonyl-2-isopropoxy-4-phenyl-1,3,2-dioxaluminin.

There is stirred for a period of 2 hours at ambient temperature a mixture comprising a solution of 7.4 g of 2,2-bis-(hydroxymethyl)-3-oxo-3-phenyl ethyl propanoate in 29 g of ethyl acetate (as described in Example 14) and a solution of 5.98 g of aluminum isopropylate in 20 ml of chloroform. The mixture is evaporated to dryness at reduced pressure at a temperature lower than or equal to 40°C, thus yielding a white powder.

|  | Calculated | Found |
|---|---|---|
| Yield (g) | 8.96 | 9.2 |
| Al (meq/g) | 3.26 | 3.19 |

EXAMPLE 16

2-chloro-5-ethoxycarbonyl-4-phenyl-1,3,2-dioxaluminin.

METHOD A

There are added 4.18 ml of a solution of 4.7 N dry hydrochloric acid in ethanol to a solution of 6 g of 5-ethoxycarbonyl-2-isopropoxy-4-phenyl-1,3,2-dioxaluminin in 15 ml of ethanol. The resulting reaction mixture is stirred for a period of 1 hour and it is then evaporated to dryness under reduced pressure at a temperature of 55° to 60°C. There is thus recovered a white powder. This product retains ½ mole of isopropanol.

|  | Calculated | Found |
|---|---|---|
| Yield (g) | 6.12 | 5.9 |
| Al (meq/g) | 3.20 | 3.23 |
| Cl (meq/g) | 3.20 | 2.93 |

METHOD B

There is mixed and stirred for a period of 1 hour a solution of 23.8 g of 2,2-bis-(hydroxymethyl)-3-oxo-3-phenyl-ethyl propanoate in 40 ml of ethyl acetate (as described in Example 14) and a solution of 19.2 g of aluminum isopropylate in 15 ml of chloroform.

There are then added 18.1 ml of a solution of 5.2 N dry HCl in isopropanol followed by stirring the reaction mixture for a period of 4 hours. Thereafter, the reaction mixture is evaporated to dryness under reduced pressure at a temperature of 60°C. The colorless powder thus obtained includes ½ mole isopropanol.

|  | Calculated | Found |
|---|---|---|
| Yield (g) | 29.5 | 29.6 |
| Al (meq/g) | 3.20 | 3.35 |
| Cl (meq/g) | 3.20 | 2.81 |

METHOD C 10 g of 2-chloro-5-ethoxycarbonyl-5-benzoyl-1,3,2-dioxaluminane are heated for a period of 1 hour at a temperature of 65°C under reduced pressure. There is thus obtained 9.2 g of a white powder (theoretical weight = 9.13 g).

|              | Calculated | Found |
|--------------|-----------|-------|
| Al (meq/g)   | 3.20      | 3.12  |
| Cl (meq/g)   | 3.20      | 2.82  |

EXAMPLE 17

5-benzoyl-2-isopropoxy-4-methyl-1,3,2-dioxaluminin and(or) 5-acetyl-2-isopropoxy-4-phenyl-1,3,2-dioxaluminin.

There is cooled to 10°C, a mixture of 12.98 g of benzoylacetone, 24 g of a 30% aqueous solution of formaldehyde and 20 ml of dioxan. Then there is added a solution of 0.4 g of potassium carbonate in 1 ml of water. The resulting reaction mixture is stirred for 1 hour while maintaining the same at a temperature between 0° to 5°C. The resulting solution is saturated with 8 g of ammonium sulfate and twice extracted with ethyl acetate. The solution resulting from the extraction is dried in the presence of anhydrous magnesium sulfate, thus yielding 74.6 g of a 25.8% solution of 2,2-bis-(hydroxymethyl)-1-phenyl 1,3-butanedione in ethyl acetate.

30.1 g of this solution are treated with stirring for 4 days at ambient temperature with a solution of 7.15 g of aluminum isopropylate in 15 ml of chloroform. After evaporation to dryness under reduced pressure at a temperature of 50°C, a yellow powder is obtained.

|              | Calculated | Found |
|--------------|-----------|-------|
| Yield (g)    | 9.66      | 9.52  |
| Al (meq/g)   | 3.62      | 3.67  |

EXAMPLE 18

5-benzoyl-2-chloro-4-methyl-1,3,2-dioxaluminin and(or) 5-acetyl-2-chloro-4-phenyl-1,3,2-dioxaluminin.

4.8 g of the product described in Example 17 are suspended in 10 ml of ethanol. To the resulting suspension there are added 3.7 ml of a solution of 4.7 N dry HCl in ethanol. The mixture is stirred for 30 minutes and then evaporated to dryness under reduced pressure at a temperature of 60°C. There is thus obtained a yellow powder which includes ½ mole of isopropanol of solvation.

|              | Calculated | Found |
|--------------|-----------|-------|
| Yield (g)    | 4.92      | 5.09  |
| Al (meq/g)   | 3.54      | 3.46  |
| Cl (meq/g)   | 3.54      | 2.97  |

EXAMPLE 19

5-acetyl-5-benzoyl-2-chloro-1,3,2-dioxaluminane.

There is stirred for a period of 4 days at ambient temperature a mixture comprising 30.1 ml of a solution of 2,2-bis-(hydroxymethyl)-1-phenyl-1,3-butanedione in ethyl acetate, as obtained in Example 17, and a solution of 7.15 g of aluminum isopropylate in 15 ml of chloroform. There are then added 7.45 ml of a solution of 4.7 N dry HCl in ethanol and the resulting mixture is then stirred for 1 hour. The solution obtained is evaporated to dryness under reduced pressure at a temperature lower than or equal to 40°C, thus yielding a yellow powder. The product retains ½ mole of isopropanol.

|              | Calculated | Found |
|--------------|-----------|-------|
| Yield (g)    | 10.94     | 10.86 |
| Al (meq/g)   | 3.20      | 3.20  |
| Cl (meq/g)   | 3.26      | 2.82  |

EXAMPLE 20

5-benzoyl-2-chloro-5-methyl-1,3,2-dioxaluminane.

a. Preparation of β,β-bis-(hydroxymethyl) propiophenone.

There is heated for a period of 15 hours in a boiling water bath a mixture of 26.8 g of propiophenone, 45 g of 40% aqueous solution of formaldehyde, 40 ml of ethanol and 1 g of potassium carbonate. The reaction mixture is poured into 250 ml water and extracted with methylene chloride. The organic extract is washed with water and dried on anhydrous magnesium sulfate. After evaporation of the solvent there are recovered 32.7 g of oil which is then purified by chromatography in a column of Mallinchkrodt 100 mesh silica. There is thus obtained 11.8 g of a product which crystallizes in isopropyl ether in the form of white needles, melting at 78°C.

b. 5-benzoyl-2-chloro-5-methyl-1,3,2-dioxaluminane.

There is heated for a period of 1 hour in a boiling water bath a mixture comprising a solution of 0.73 g of β,β-bis-(hydroxymethyl) propiophenone in 10 ml of ethyl acetate and a solution of 0.77 g of aluminum isopropylate in 5 ml of chloroform. After cooling, there is added a solution of 0.8 ml of 4.75 N dry HCl in ethanol and the resulting mixture is left to stand for 30 minutes. The mixture is then evaporated to dryness under reduced pressure thus yielding a yellowish powder which includes ½ mole of isopropanol of solvation.

|              | Calculated | Found |
|--------------|-----------|-------|
| Yield (g)    | 1.07      | 1.03  |
| Al (meq/g)   | 3.52      | 3.52  |
| Cl (meq/g)   | 3.52      | 3.32  |

EXAMPLE 21

5-ethoxycarbonyl-2-isopropoxy-5-methyl-1,3,2-dioxaluminane.

There is heated to reflux for a period of 60 minutes a mixture comprising a solution of 2.93 g of 2,2-bis-(hydroxymethyl) ethyl propionate in 20 ml of ethyl acetate and a solution of 3.7 g. of aluminum isopropylate in 20 ml of chloroform. The resulting mixture is evaporated to dryness under reduced pressure, thus yielding a white powder.

|              | Calculated | Found |
|--------------|-----------|-------|
| Yield (g)    | 4.45      | 4.20  |
| Al (meq/g)   | 4.06      | 4.23  |

EXAMPLE 22

2-chloro-5-ethoxycarbonyl-5-methyl-1,3,2-dioxaluminane.

There is heated to reflux for a period of 1 hour a mixture comprising a solution of 6.4 g of 2,2-bis-(hydroxymethyl) ethyl propionate in 15 ml of ethyl acetate and a solution of 8.1 g of aluminum isopropylate in 25 ml of chloroform. After cooling there are added 8.4 ml of a solution of 4.75 N dry HCl in ethanol. The resulting reaction mixture is stirred for 1 hour. After evaporation to dryness under reduced pressure there is obtained a solid colorless product containing a ½ mole of isopropanol of solvation.

|  | Calculated | Found |
|---|---|---|
| Yield (g) | 10 | 10 |
| Al (meq/g) | 3.95 | 4.02 |
| Cl (meq/g) | 3.95 | 3.27 |

EXAMPLE 23

4-ethoxy-5-ethoxycarbonyl-2-isopropoxy-6-methyl 1,3,2-dioxaluminin.

There is heated for a period of 2 hours at 50°C a solution of 11.8 g of (1-hydroxy ethyl) ethyl malonate (F. Gaudemar-Bardone and M. Gaudemar, Bull. Soc. Chim., 1968, p. 2878; A. Roesch, Bull. Soc., 1937, p. 1643) and 11.8 g of aluminum isopropylate in 30 ml of chloroform. The resulting reaction mixture is evaporated to dryness under reduced pressure at a temperature of 80°–85°C, thus yielding a transparent yellowish semi-solid product.

|  | Calculated | Found |
|---|---|---|
| Yield (g) | 16.7 | 16.8 |
| Al (meq/g) | 3.47 | 3.45 |

EXAMPLE 24

2-chloro-4-ethoxy-5-ethoxycarbonyl-6-methyl 1,3,2-dioxaluminin.

A solution of 14.6 g of the product obtained in Example 23, in 50 ml of ethanol, is reacted with stirring for 30 minutes with 10.7 ml of a solution of 4.75 N dry HCl in ethanol. The resulting solution is concentrated to dryness under reduced pressure at a temperature of 70°C, thus yielding a beige colored solid retaining a ½ mole isopropanol.

|  | Calculated | Found |
|---|---|---|
| Yield (g) | 14.7 | 14.0 |
| Al (meq/g) | 3.4 | 3.53 |
| Cl (meq/g) | 3.4 | 2.97 |

EXAMPLE 25

2,4-diethoxy-5-ethoxycarbonyl-1,3,2-dioxaluminin.

There is heated to the boil for a period of 1 hour a mixture of 4.4 g of 2,2-bis-(hydroxymethyl) ethyl malonate (see Example 23) and 3.24 g of aluminum ethylate in 70 ml of ethanol.

After evaporation to dryness under reduced pressure there is obtained a colorless powder.

|  | Calculated | Found |
|---|---|---|
| Yield (g) | 5.20 | 5.21 |
| Al (meq/g) | 3.85 | 3.86 |

EXAMPLES OF COMPOSITION

EXAMPLE 26

An antiperspirant cream according to the invention is prepared by mixing the following:

| | |
|---|---|
| Stearyl alcohol oxyethylenated with 15 moles ethylene oxide | 12 g |
| Spermaceti wax | 4 g |
| Isopropyl myristate | 3 g |
| Silicone oil (density at 25°C=1.05–1.08; refractory index, 1.485–1.495) | 0.5 g |
| Methyl para-hydroxybenzoate | 0.1 g |
| Propyl para-hydroxybenzoate | 0.1 g |
| Propylene glycol | 2 g |
| 2-chloro-5,5-bis-(ethoxycarbonyl) 1,3,2-dioxaluminane | 2 g |
| Perfume | 0.5 g |
| Water, q.s.p. | 100 g |

EXAMPLE 27

An antiperspirant stick according to the invention is prepared by mixing the following ingredients:

| | |
|---|---|
| Stearyl alcohol | 10 g |
| Microcrystalline wax | 4 g |
| Paraffin | 10 g |
| Coprah monoethanolamide | 10 g |
| Stearic diethanolamide | 10 g |
| 2-octyl-1-dodecanol | 10 g |
| Propylene glycol | 20 g |
| Ethyl alcohol | 20 g |
| Perfume | 1 g |
| 2-chloro-5,5-bis-(ethoxycarbonyl) 1,3,2-dioxaluminane | 5 g |

EXAMPLE 28

An antiperspirant stick according to the invention is prepared by mixing the following ingredients:

| | |
|---|---|
| Stearic diethanolamide | 5 g |
| Mixture consisting of 30% cetyl alcohol and 70% stearyl alcohol, oxyethylenated with 13 moles of ethylene oxide per mole of alcohol of the mixture | 10 g |
| Water | 20 g |
| Microcrystalline wax | 5 g |
| Paraffin oil | 10 g |
| Perhydrosqualene | 3 g |
| Beeswax | 5 g |
| Ethyl alcohol | 36 g |
| 2-chloro-4-ethoxy-5-ethoxycarbonyl 1,3,2-dioxaluminin | 5 g |
| Perfume | 1 g |

EXAMPLE 29

An alcohol-based spray according to the invention is prepared by mixing the following ingredients:

| | |
|---|---|
| Hexachlorophene | 0.1 g |
| 2-chloro-4-methyl-5-ethoxycarbonyl 1,3,2-dioxaluminin | 5.2 g |
| Perfume | 1 g |

-continued

| | |
|---|---|
| Ethyl alcohol | 93.7 g |

50 g of this mixture are packaged in an aerosol container together with 50 g of dichlorodifluoromethane.

There is obtained an equally excellent alcohol-based spray by replacing the 2-chloro-4-methyl-5-ethoxycarbonyl-1,3,2-dioxaluminin by the following compounds: 5,5-bis-(ethoxycarbonyl)-2-p-toluenesulfonyloxy-1,2,3-dioxaluminane; 5-benzoyl-2-chloro-4-methyl-1,3,2-dioxaluminin; and 2-chloro-4-ethoxy-5-ethoxycarbonyl-6-methyl-1,3,2-dioxaluminin.

EXAMPLE 30

An alcohol-based spray according to the invention is prepared by mixing the following components:

Compound of the formula:

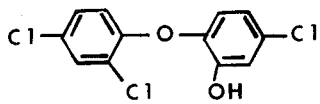

| | | |
|---|---|---|
| | 0.15 | g |
| 2-chloro-5-acetyl-4-methyl-1,3,2-dioxaluminin | 4 | g |
| Perfume | 1 | g |
| Lanolin oxyethylenated with 16 moles of ethylene oxide | 0.5 | g |
| Absolute ethyl alcohol, q.s.p. | 100 | g |

35 g of this mixture are then packaged in an aerosol container together with 40 g of trichlorofluoromethane and 25 g of dichlorodifluoromethane.

An equally excellent alcohol-based spray is obtained by replacing the 2-chloro-5-acetyl-4-methyl-1,3,2-dioxaluminin with 2-chloro-4-ethoxy-5-ethoxycarbonyl-6-methyl-1,3,2-dioxaluminin; 5-acetyl-5-benzoyl-2-chloro-1,3,2-dioxaluminane; 5-acetyl-2-chloro-5-methyl-1,3,2-dioxaluminane and 5-benzoyl-2-chloro-5-ethoxycarbonyl-1,3,2-dioxaluminane.

EXAMPLE 31

A dry antiperspirant spray according to the invention is prepared by mixing the following components:

| | |
|---|---|
| 2-chloro-5-cyano-5-nitro-1,3,2-dioxaluminane | 35 g |
| Colloidal silica | 3 g |
| Perfume | 7 g |
| Isopropyl palmitate, q.s.p. | 100 g |

10 g of this mixture are then packaged in an aerosol container together with 45 g of trichlorofluoromethane and 45 g of dichlorodifluoromethane.

EXAMPLE 32

A dry antiperspirant spray according to the invention is prepared by mixing the following components:

| | |
|---|---|
| 5-acetyl-2-chloro-4-phenyl-1,3,2-dioxaluminin | 35 g |
| Colloidal silica | 3 g |
| Perfume | 7 g |
| Triglyceride fatty acid of $C_8$–$C_{12}$, q.s.p. | 100 g |

10 g of this mixture are then packaged in an aerosol container, together with 45 g of trichlorofluoromethane and 45 g of dichlorodifluoromethane.

EXAMPLE 33

A dry spray according to the invention is prepared by mixing the following components:

| | |
|---|---|
| 2-chloro-5-ethoxycarbonyl-4-phenyl-1,3,2-dioxaluminin | 3.5 g |
| Hexachlorophene | 0.1 g |
| Perfume | 0.2 g |
| Starch ester | 0.3 g |
| Silicone oil | 1.2 g |
| Trichloromonofluoromethane | 47.35 g |
| Dichlorodifluoromethane | 47.35 g |

EXAMPLE 34

A dry talc-based spray according to the invention is prepared by mixing the following components:

| | |
|---|---|
| Sorbitan trioleate (viscosity at 25°C=250 cps, HLB = 1.8 (hydrophilic lypophilic balance)) | 4 g |
| Isopropyl myristate | 6.5 g |
| Deodorized kerosene | 8 g |
| Polyethylene glycol (M.W. = 400) | 4 g |
| Colloidal silica | 4 g |
| Microtalc (5 microns) | 52 g |
| Perfume | 1 g |
| 2-chloro-5-bromo-5-nitro-1,3,2-dioxaluminane | 20 g |

10 g of this mixture are then packaged in an aerosol container together with 45 g of trichloromonofluoromethane and 45 g of dichlorodifluoromethane.

An equally excellent spray is obtained by replacing the 2-chloro-5-bromo-5-nitro-1,3,2-dioxaluminane with 2-methanesulfonyloxy-5,5'-bis-(ethoxycarbonyl)-1,3,2-dioxaluminane.

EXAMPLE 35

A deodorant talc in the form of a spray is prepared by mixing the following components:

| | |
|---|---|
| Sorbitan trioleate | 4 g |
| Isopropyl myristate | 6.5 g |
| Deodorized kerosene | 8 g |
| Polyethylene glycol (M.W. = 400) | 4 g |
| Colloidal silica | 4 g |
| Microtalc (5 microns) | 22.5 g |
| Perfume | 1 g |
| 2-chloro-5-cyano-4-ethoxy-1,3,2-dioxaluminin | 50 g |

10 g of this mixture are then packaged in an aerosol container together with 45 g of trichloromonofluoromethane and 45 g of dichlorodifluoromethane.

EXAMPLE 36

A composition in the form of a compressed powder according to the invention is prepared by mixing the following ingredients:

| | |
|---|---|
| Talc | 70 g |
| Lanolin | 2.5 g |
| Vaseline oil | 2 g |
| Perfume | 0.5 g |
| 2-chloro-5-ethoxycarbonyl-5-methyl-1,3,2-dioxaluminane | 25 g |

What is claimed is:
1. An antiperspirant cosmetic composition comprising in a solvent selected from the group consisting of water, a lower alkanol and an aqueous solution of said lower alkanol, 0.2–30 percent by weight of an active compound having the formula

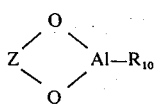

wherein
$R_{10}$ is selected from the group consisting of chloro, —O-R″ wherein R″ is selected from the group consisting of methyl, ethyl, isopropyl and tertiary butyl and —$OSO_2R'$ wherein R′ is selected from the group consisting of alkyl having 1–4 carbon atoms, phenyl, p-chlorophenyl, hydroxyphenyl, tolyl and 2-oxo-10-bornanyl, and Z represents a member selected from the group consisting of (1) 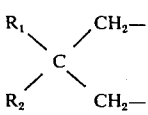

wherein
$R_1$ is selected from the group consisting of
a. —$COR_3$ wherein $R_3$ is selected from the group consisting of (i) methyl, (ii) ethyl, in which cases $R_2$ is methyl, and (iii) phenyl in which case $R_2$ is selected from the group consisting of methyl, acetyl and —$COOR_4$ wherein $R_4$ is alkyl containing 1–4 carbon atoms,
b. —$COOR_4$ wherein $R_4$ has the meaning given above in which case $R_2$ represents a member selected from the group consisting of methyl, —C≡N and —$COOR_4$ wherein $R_4$ has the meaning given above,
c. —$NO_2$ in which case $R_2$ represents a member selected from the group consisting of bromine and alkyl containing 1–3 carbon atoms; and (2) 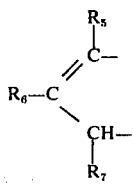

wherein
$R_7$ represents a member selected from the group consisting of
d. methyl, in which case $R_6$ is $COOR_8$ and $R_5$ represents —O-$R_8$, wherein $R_8$ represents alkyl having 1–4 carbon atoms, and
e. hydrogen, in which case $R_6$ is selected from the group consisting of
  iv. —$COR_9$ wherein $R_9$ is selected from the group consisting of methyl, in which case $R_5$ is selected from the group consisting of methyl and phenyl, and phenyl, in which case $R_5$ is methyl;
  v. —$COOR_8$ in which case $R_5$ is selected from the group consisting of methyl, phenyl and —O-$R_8$ wherein $R_8$ has the meaning given above; and
  vi. —C≡N in which case $R_5$ represents —O-$R_8$ wherein $R_8$ has the meaning given above.

2. The composition of claim 1 wherein said active compound is selected from the group consisting of 2-chloro-5,5-bis-(ethoxycarbonyl)-1,3,2-dioxaluminane,
2-chloro-5-cyano-5-ethoxycarbonyl-1,3,2-dioxaluminane,
2-chloro-5-bromo-5-nitro-1,3,2-dioxaluminane,
2-chloro-5-ethoxycarbonyl-4-ethoxy-1,3,2-dioxaluminin,
2-chloro-5-ethoxycarbonyl-4-methyl-1,3,2-dioxaluminin,
2-chloro-5-acetyl-4-methyl-1,3,2,-dioxaluminin,
2-methanesulfonyloxy-5,5-bis-(ethoxycarbonyl)-1, 3, 2-dioxaluminane,
5,5-bis-(ethoxycarbonyl)-2-p-toluene sulfonyloxy-1,3,2-dioxaluminane,
5-acetyl-2-chloro-5-methyl-1,3,2-dioxaluminane,
5-benzoyl-2-chloro-5-methyl-1,3,2-dioxaluminane,
2-chloro-5-cyano-4-ethoxy-1,3,2-dioxaluminane,
5-benzoyl-2-chloro-5-ethoxycarbonyl-1,3,2-dioxaluminane,
2-chloro-5-ethoxycarbonyl-5-methyl-1,3,2-dioxaluminane,
2-chloro-5-ethoxycarbonyl-4-phenyl-1,3,2-dioxaluminane,
5-acetyl-5-benzoyl-2-chloro-1,3,2-dioxaluminane,
5-acetyl-2-chloro-4-phenyl-1,3,2-dioxaluminin,
5-benzoyl-2-chloro-4-methyl-1,3,2-dioxaluminin and
2-chloro-4-ethoxy-5-ethoxycarbonyl-6-methyl-1,3,2-dioxaluminin.

3. The composition of claim 1 wherein said active compound is present in amounts between 0.5–25 percent by weight of said composition.

4. An antiperspirant cosmetic powder composition comprising in a carrier selected from the group consisting of talc, magnesium carbonate, rice starch, corn starch, kaolin, bentonite, lithium stearate, zinc stearate, magnesium stearate and mixtures thereof, 0.2–30 percent by weight of an active compound having the formula

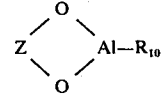

wherein
$R_{10}$ is selected from the group consisting of chloro, —O-R″ wherein R″ is selected from the group consisting of methyl, ethyl, isopropyl and tertiary butyl and —$SO_2R'$ wherein R′ is selected from the group consisting of alkyl having 1–4 carbon atoms, phenyl, p-chlorophenyl, hydroxyphenyl, tolyl and 2-oxo-10-bornanyl, and Z represents a member selected from the group consisting of (1) 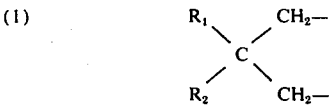

wherein
$R_1$ is selected from the group consisting of a. —$COR_3$ wherein $R_3$ is selected from the group consisting of (i) methyl, (ii) ethyl, in which cases $R_2$ is methyl, and (iii) phenyl, in which case $R_2$ is selected from the group consisting of methyl, acetyl and —$COOR_4$ wherein $R_4$ is alkyl containing 1–4 carbon atoms, b. —$COOR_4$ wherein $R_4$ has the meaning given above in which case $R_2$ represents a member selected from the group consisting of methyl, —C≡N and —$COOR_4$ wherein $R_4$ has the meaning given above, c. —$NO_2$ in which case $R_2$ represents a member selected from the group consisting of bromine and alkyl containing 1–3 carbon atoms; and (2) 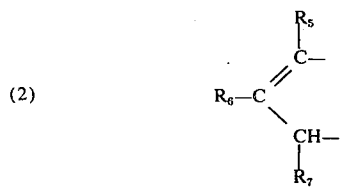

wherein $R_7$ represents a member selected from the group consisting of d. methyl, in which case $R_6$ is $COOR_8$ and $R_5$ represents —$O-R_8$, wherein $R_8$ represents alkyl having 1–4 carbon atoms, and e. hydrogen, in which case $R_6$ is selected from the group consisting of iv. —$COR_9$ wherein $R_9$ is selected from the group consisting of methyl, in which case $R_5$ is selected from the group consisting of methyl and phenyl, and phenyl, in which case $R_5$ is methyl;

v. —$COOR_8$ in which case $R_5$ is selected from the group consisting of methyl, phenyl and —$O-R_8$ wherein $R_8$ has the meaning given above; and vi. —C≡N in which case $R_5$ represents —$O-R_8$ wherein $R_8$ has the meaning given above.

5. The antiperspirant cosmetic powder composition of claim 4 wherein said active compound is present in an amount between 5–25 percent by weight of said composition.

6. The antiperspirant cosmetic powder composition of claim 4 which also contains a liquified aerosol propellant selected from the group consisting of trichlorofluoromethane, dichlorodifluoromethane and mixtures thereof, said composition being packaged under pressure in an aerosol container.

7. An antiperspirant cosmetic aerosol composition packaged under pressure in an aerosol container comprising in a liquified aerosol propellant selected from the group consisting of trichlorofluoromethane, dichlorodifluoromethane and mixtures thereof, 0.2–30 percent by weight of an active compound of the formula

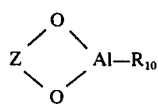

wherein $R_{10}$ is selected from the group consisting of chloro, —O-R″ wherein R″ is selected from the group consisting of methyl, ethyl, isopropyl and tertiary butyl and —$OSO_2R'$ wherein R′ is selected from the group consisting of alkyl having 1–4 carbon atoms, phenyl, p-chlorophenyl, hydroxyphenyl, tolyl and 2-oxo-10-bornanyl, and Z represents a member selected from the group consisting of (1) 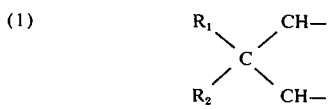

wherein $R_1$ is selected from the group consisting of a. —$COR_3$ wherein $R_3$ is selected from the group consisting of (i) methyl, (ii) ethyl, in which cases $R_2$ is methyl, (iii) phenyl, in which case $R_2$ is selected from the group consisting of methyl, acetyl and —$COOR_4$ wherein $R_4$ is alkyl containing 1–4 carbon atoms, b. —$COOR_4$ wherein $R_4$ has the meaning given above in which case $R_2$ represents a member selected from the group consisting of methyl, —C≡N and —$COOR_4$ wherein $R_4$ has the meaning given above, c. —$NO_2$ in which case $R_2$ represents a member selected from the group consisting of bromine and alkyl containing 1–3 carbon atoms; and (2) 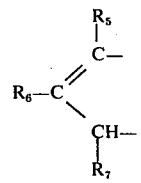

wherein $R_7$ represents a member selected from the group consisting of d. methyl, in which case $R_6$ is $COOR_8$ and $R_5$ represents —$O-R_8$, wherein $R_8$ represents alkyl having 1–4 carbon atoms, and e. hydrogen, in which case $R_6$ is selected from the group consisting of iv. —$COR_9$ wherein $R_9$ is selected from the group consisting of methyl, in which case $R_5$ is selected from the group consisting of methyl and phenyl, and phenyl, in which case $R_5$ is methyl, v. —$COOR_8$ in which case $R_5$ is selected from the group consisting of methyl, phenyl and —$O-R_8$ wherein $R_8$ has the meaning given above; and vi. —C≡N in which case $R_5$ represents —$O-R_8$ wherein $R_8$ has the meaning given above.

8. The antiperspirant cosmetic aerosol composition of claim 7 wherein said active compound is present in an amount between 1–5 percent by weight of said composition.

9. The antiperspirant cosmetic aerosol composition of claim 7 which also contains a lower alkanol selected from the group consisting of ethanol and isopropanol.

* * * * *

UNITED STATES PATENT OFFICE
CERTIFICATE OF CORRECTION

Patent No. 3,929,986          Dated December 30, 1975

Inventor(s) Claude Bouillon, Pierre Dufaure and Georges Rosenbaum

It is certified that error appears in the above-identified patent and that said Letters Patent are hereby corrected as shown below:

In the Heading:

Under [62] Pat. No. 3,819,761 should read --Pat. No. 3,819,671--.

Column 1, line 6, should read --U.S. Pat. No. 3,819,671--.

Column 3, line 5, the structural formula should read

-- 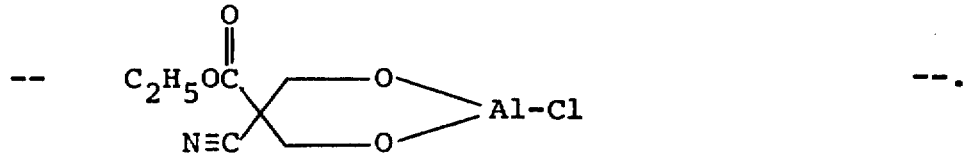 --.

Column 9, in Scheme A, the structural formula immediately above "(4)" should read -- 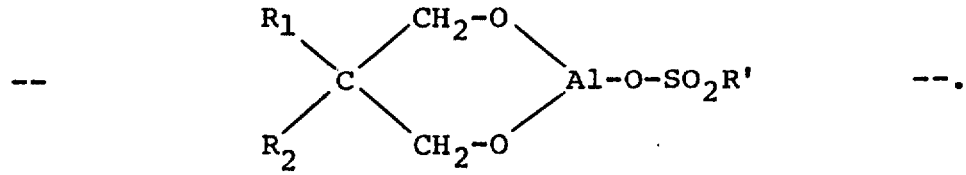 --.

UNITED STATES PATENT OFFICE
CERTIFICATE OF CORRECTION

Patent No. 3,929,986   Dated December 30, 1975

Inventor(s)   Claude Bouillon et al.   Page 2 of 2

It is certified that error appears in the above-identified patent and that said Letters Patent are hereby corrected as shown below:

Column 11, in Scheme B, the structural formula immediately above "(7)" should read

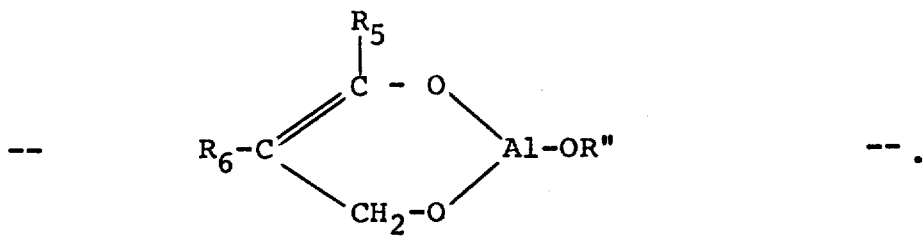

Column 12, in Scheme B, the structural formula immediately above "(8)" should read

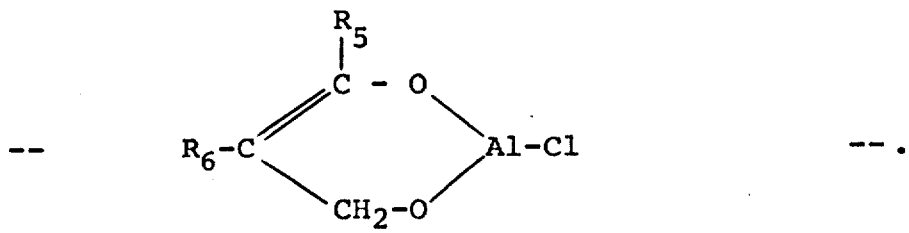

Signed and Sealed this

Thirtieth Day of November 1976

[SEAL]

Attest:

RUTH C. MASON
Attesting Officer

C. MARSHALL DANN
Commissioner of Patents and Trademarks